Patented Feb. 12, 1924.

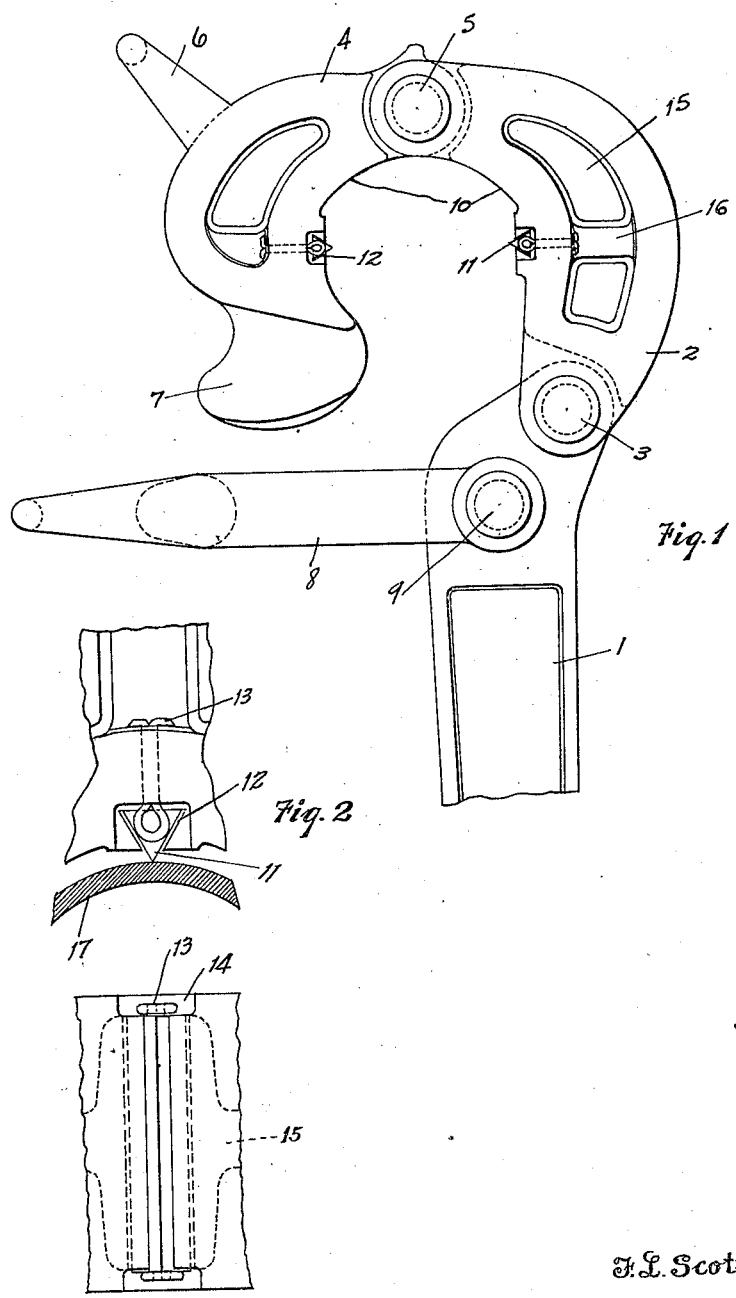

1,483,486

UNITED STATES PATENT OFFICE.

FLOYD L. SCOTT, OF HOUSTON, TEXAS, ASSIGNOR TO HUGHES TOOL COMPANY, OF HOUSTON, TEXAS.

PIPE WRENCH.

Application filed April 11, 1922. Serial No. 551,677.

*To all whom it may concern:*

Be it known that I, FLOYD L. SCOTT, a citizen of the United States, residing at Houston, Harris County, Texas, have invented a certain new and useful Improvement in Pipe Wrenches, of which the following is a full, clear, and exact description, such as will enable others skilled in the art to which it appertains to make and use the same.

My invention relates to pipe tongs for use in handling pipe especially in the operations connected with well drilling. The specific improvement comprises an arrangement for most advantageously mounting teeth in the pipe engaging faces of the jaws.

The object of my invention is to mount the teeth in the faces of the jaws loosely, so that they will have free movement in the openings in which they are seated and to provide means on the jaws to prevent removal of the teeth from the openings in which they are mounted.

Referring to the drawings herewith, wherein like numerals of references are applied to like parts in the several views; Fig. 1 is a side elevation of the head of a wrench in which my improvement is employed; Fig. 2 is a broken side view of a wrench jaw showing the teeth in pipe engaging position and Fig. 3 is a broken view looking at the toothed face of the wrench jaw.

In the use of pipe wrenches it is common to employ in the pipe engaging portion of the jaws a removable tooth of hardened material which may be secured by various different means in the face of the jaw. It is found, in the manufacture of these teeth, that they will very rarely fit with such exactness in the opening in the jaw that they can be readily mounted in position. It is common to secure them in place by driving wedges into the openings in which the teeth are secured and thus wedging them into position. If the tooth is slightly over-size it will not fit into its rest at all. The desire of the manufacturer has always been to secure the tooth rigidly in position.

I have found that it is much more advantageous to provide an opening, in which the tooth must be seated, of materially larger gauge than the size of the tooth. Manifestly such a tooth will be easily lost from its seat unless provision is made to prevent such result.

In Fig. 1 I have shown a pipe wrench having a handle bent slightly to one side at the upper end and having a jaw 2 pivoted thereto at 3. At the other end of the jaw 2 a second jaw 4 is pivoted by means of a pin 5. The jaw 4 is provided with a handle 6 and a forward hook 7. A latching yoke 8 is pivoted at 9 to the handle and has a central opening adapted to receive the hook 7 and engage over the end thereof in an obvious manner.

I have shown the pipe engaging faces 10 of the jaws each provided with a triangular shaped tooth 11, projecting somewhat from the face of the jaw. While I have shown the teeth as triangular in shape it is obvious that they may be rectangular or of any other shape now in ordinary use. Each tooth is fitted loosely within an opening 12 in the jaw, said opening being of larger size and gauge than the tooth itself, so that the said tooth will fit loosely therein as shown particularly in Fig. 2. Measured longitudinally, the tooth is slightly shorter than the thickness of the jaw, so that means may be provided at each end to prevent its removal from its seat. For this purpose I have provided a cotter pin 13. To mount this cotter pin, the jaw at each end of the tooth is recessed slightly as shown at 14 of slightly greater depth than is the thickness of the cotter pin as shown in Fig. 3, and an opening in the jaw is provided to receive the pin. In the particular wrench here disclosed the central portion of the jaw is recessed to remove some of the weight of the jaw leaving a central web 15. This web is of somewhat greater thickness at 16 where the cotter pin is placed so as to strengthen the jaw and still allow sufficient room to receive the end of the cotter pin as shown in the drawing.

In the use of this improvement, the teeth need not be carefully gauged to the exact size of the opening in which they are to be received as the opening is of materially larger size than the tooth and slight variations in the size of the tooth or of the opening 12 will not cause any difficulty.

The tooth may be quickly dropped into the opening in which it is seated and the cotter pins may be fixed at each end of the tooth and thus prevent its removal. While the hole is larger than the tooth, it is still small enough to limit the play of the tooth beyond the desired amount. This process of securing the tooth in place can be accomplished much more quickly and easily than is done in the ordinary method of securing the tooth in position and there is no danger of the tooth being lost in operation. When the tooth becomes dulled and needs to be replaced, or the tooth turned in its seat, the cotter pin may be released and the tooth quickly changed.

The advantage of this construction will be apparent to ones skilled in the art. It will not only be more reliable in actual use, but will be much more expeditiously handled. Furthermore the process of manufacturing the wrench or the tooth may be much more cheaply done due to the fact that exactness is not required. The fact that the tooth is a loose fit in the jaw will not interfere at all in the successful operation of the wrench. As shown particularly in Fig. 2, the tooth will be forced by contact with the pipe 17 firmly against the lower face of the opening and will act to grip in the same manner as it would if there was a close fit between the tooth and its opening.

Having thus described my invention, what I claim is new, and desire to protect by Letters Patent is:

In a pipe wrench, a jaw having a concave inner face, a tooth projecting from said face, said tooth being triangular in transverse section and fitting loosely within an opening in said jaw of larger gauge than said tooth, and cotter pins in said jaw extending over each end of said tooth to prevent removal of said tooth in the operation of said wrench.

In testimony whereof I hereunto affix my signature, this the 3rd day of April, A. D., 1922.

FLOYD L. SCOTT.